United States Patent
Woods et al.

[11] 3,718,615
[45] Feb. 27, 1973

[54] HALOGENATED POLYMERIC COMPOSITIONS CONTAINING ZINC BORATE

[75] Inventors: William G. Woods, Fullerton, Joseph G. Whiten, Dublin, Nelson P. Nies, Laguna Beach, all of Calif.

[73] Assignee: United States Borax & Chemical Corporation, Los Angeles, Calif.

[22] Filed: March 5, 1971

[21] Appl. No.: 121,603

Related U.S. Application Data

[63] Continuation-in-part of Ser. No. 725,169, April 29, 1968, abandoned.

[52] U.S. Cl. ............260/28, 260/28.5 D, 106/15 FP
[51] Int. Cl. ......C08h 51/04, C08f 45/04, C09d 5/18
[58] Field of Search......260/28, DIG. 24, 28.5 D, 40, 260/41 R; 106/15 FP; 23/55, 59

[56] References Cited

UNITED STATES PATENTS

| | | | |
|---|---|---|---|
| 3,549,316 | 12/1970 | Nies | 23/59 |
| 2,405,366 | 8/1946 | Myhren et al. | 23/59 |
| 2,745,217 | 7/1956 | Allen | 106/15 FP |

OTHER PUBLICATIONS

Industrial & Engineering Chemistry, August, 1949, pages 1742–1749, Weisberg et al.

*Primary Examiner*—Morris Liebman
*Assistant Examiner*—S. L. Fox
*Attorney*—James R. Thornton

[57] ABSTRACT

Halogenated polymeric compositions containing a fire retarding amount of zinc borate of the formula $2ZnO \cdot 3B_2O_3 \cdot 3.5H_2O$.

14 Claims, No Drawings

HALOGENATED POLYMERIC COMPOSITIONS CONTAINING ZINC BORATE

RELATED APPLICATIONS

This is a continuation-in-part of our copending application Ser. No. 725,169 filed Apr. 29, 1968 and now abandoned.

BACKGROUND AND SCOPE

This invention relates to novel fire retarding polymeric compositions, and to methods for rendering such polymeric materials fire retardant. Polymeric materials are being widely used today in applications where it is highly desirable that the polymeric compositions be fire retardant and flame resistant. Prior art attempts to impart fire resistance to polymers by the use of additives have often adversely affected other desirable properties of the polymer.

The search for compounds or compositions of matter as flame retardants for polymers has been intensively conducted industrially. The use of compounds containing phosphorus and/or nitrogen as flame retardant additives for some polymers has been recognized, as has been the use of various halogenated materials, such as chlorinated paraffin wax, and antimony compounds such as antimony oxide, and mixtures thereof. The disadvantage, however, in regard to the known prior art materials which have been used as flame retardants has been the fact that generally a large amount of the additive must be incorporated into the polymer to make it sufficiently flame retardant. In addition, the prior art flame retardant additives frequently do not stand up to processing conditions and will in some cases separate out from the resin after incorporation. The search for fire retarding adjuvants is important because it is essential that many resin compositions have relatively high resistance to burning if they are to be commercially utilizable. Further, the resins must be capable of enduring heat without deterioration and be able to resist fire and flame. Especially, materials used in conjunction with electricity must be able to resist ignition or deterioration by heat and sparks. Also, it is quite essential that structural materials have excellent flame retardance. As the requisite degree of flame retardance is achieved, it is essential that the other desirable qualities of the resinous material be preserved or enhanced. In addition to the preservation of the mechanical properties of the polymer, it is desirable that the color should not be adversely affected.

BRIEF DESCRIPTION

It has now been discovered that a zinc borate having a specific water of hydration which, when added to halogenated polymers, produces excellent flame retarding compositions without strongly adversely affecting other physical properties of the polymer.

The compound of the present invention is a zinc borate having the formula: $2ZnO \cdot 3B_2O_3 \cdot 3.5H_2O$. Due to slight amounts of impurities and analytical errors, the $H_2O$ content can vary between about 3.3 and 3.7 but it will generally average about $3.5H_2O$. It will be appreciated that this zinc borate has a much lower degree of water of hydration than previously utilized zinc borates. Due to the low amount of water of hydration there is less problem with this zinc borate when it is added to polymeric material with regard to formation of bubbles than with other zinc borates or other inorganic material during processing, molding and curing. When the specific zinc borate is added to polymers, fire resistance of the polymers is greatly improved while the other physical properties of the polymers are not deteriorated.

A method for producing the zinc borate of low hydration is set forth in copending application of Nies et al., Ser. No. 648,968, filed June 26, 1967, now U.S. Pat. No. 3,549,316.

The invention, therefore, provides an additive for resins, particularly of the halogenated type, which will provide a highly beneficial effect on the fire retarding abilities of the resin without producing an impairment of the other desirable properties of the resins.

As was stated, the additives of the present invention are particularly useful with halogen containing plastic compositions. For example, the halogen containing polyesters are more flame resistant than the non-halogenated polyesters. However, the flame resistance of even a halogenated polyester is not sufficient for some uses, such as in buildings. Antimony trioxide has been incorporated into such polyester resins in an attempt to increase the flame resistance of the resins. Also, chlorinated paraffin wax has been added to polyesters. Unfortunately, the addition of antimony trioxide in sufficient quantity to render the halogenated polyester substantially flame resistant has been found to have an adverse effect on the appearance of the halogenated polyester resin. Further, the addition of the chlorinated paraffin wax has been found to have a detrimental effect on other desirable properties of the polyester resin. It has also been suggested to incorporate tetrachlorophthalic acid or anhydride in the halogenated polyester resins to improve their ability to resist fire. However, these compositions have only poor flame retardant properties and usually possess low stability and low strength characteristics at elevated temperatures. Therefore, they are not entirely satisfactory for many applications. In like manner, the use of certain organic phosphorus compounds has been found unsatisfactory.

The additive of the present invention, namely, $2ZnO \cdot 3B_2O_3 \cdot 3.5H_2O$, is also effective in other halogenate resins, for example, polyvinyl chloride. The applicable halogenated resin may contain a fairly low to relatively high halogen content; at least about 10 percent and preferably at least about 15 percent. The zinc borate may be present in an amount of from 0.2 to 50 percent by weight of the total resin formulation, a preferable range is 0.5 to 30 percent by weight of the total resin formulation.

Inasmuch as degree of fire retardance is a result of carrying out the precepts of the present invention it is propitious to set forth a test procedure for determining the relative and comparative fire retarding abilities contributed to the resin formulation by the zinc borate of the present invention. The test procedure should have the capability of indicating reproducible results.

A test method utilized is as follows and is depicted as:

INTERMITTENT FLAME TEST PROCEDURE

Specimen preparation:

Polymeric material to be tested should be unreinforced or flat glass mat reinforced laminate 0.125 × 0.5 × 8 inches. Edges should be smooth and rectangular. Five specimens should be tested for each casting to be evaluated.

Apparatus preparation:

Adjust a Tirrell burner flame to have a 1.5 inch inner blue cone with a flame height of approximately 5 inches. The axis of the burner should be at an angle of 20° from vertical.

Conditions:

Tests should be made under draft-free conditions.

Testing procedure:

The specimen is clamped vertically and the tip of the inner blue cone of the flame is just touching the lower edge of the 0.5 inch dimension of the specimen.

The flame is applied to the specimen and then removed according to the following schedule.

| Application | On Time (Seconds) | Off Time (Seconds) |
|---|---|---|
| 1 | 5 | 10 |
| 2 | 7 | 14 |
| 3 | 10 | 20 |
| 4 | 15 | 30 |
| 5 | 25 | 50 |

When the burning is observed to continue longer than the "off time" no further flame applications should be made to the specimen and the total burning time after removal of the flame should be recorded. Burning time in excess of 120 seconds should be considered as continuous and recorded as Continuous Burning (C.B.).

Rating:

1. If all of five samples can be carried through all five ignitions and if their burning time after the last ignition does not exceed the specified maximum time (50 seconds), the rating is 100.
2. If all five samples exceed the allowed burning time after the first ignition (10 seconds), the rating is 0.
3. If, for instance, two samples carry through three ignitions and three samples through four ignitions, the rating would be 72.

DETAILED DESCRIPTION

To illustrate the invention, a series of examples was prepared of a styrenated chlorinated polyester resin, such as Hetron 353, a product of Hooker Chemical Corporation, containing about 23–25 percent chlorine. The resin was divided into batches and labeled as examples as indicated in the following table. The resin batches were preaccelerated with a cobalt salt for use with methyl ethyl ketone peroxide catalyst. The zinc borate of the present invention and other additives were stirred into respective batches comprising the examples until a smooth paste was attained. The resultants were de-gassed under oil pump vacuum. Methyl ethyl ketone peroxide at the rate of one part per hundred of resin was then stirred in carefully to avoid introduction of air bubbles. The mixtures were then poured into molds.

The resulting castings were cured at room temperature for approximately 12 hours after which they were removed from the mold and post cured for 2 hours in a forced air oven maintained at 180°F.

The castings were then conditioned for at least 48 hours at 70°F. and 50 percent relative humidity. Then the castings were cut into pieces of 8 × 0.5 × 0.125 inches and flame tested in accordance with the Intermittent Flame Test Procedure (IFTP) as outlined in the above.

TABLE I

Examples 1–13

| Example No. | Fire Retardant Additive | % by weight | Flame Test results (IFTP) |
|---|---|---|---|
| 1 | None | — | 52 |
| 2 | Antimony oxide | 1 | 84 |
| 3 | Antimony oxide | 2.4 | 84 |
| 4 | Antimony oxide | 4.7 | 80 |
| 5 | Antimony oxide $2ZnO \cdot 3B_2O_3 \cdot 3.5H_2O$ | 1 3.8 | 100 |
| 6 | ditto (both) | 2.4 2.4 | 100 |
| 7 | $2ZnO \cdot 3B_2O_3 \cdot 3.5H_2O$ | 0.5 | 72 |
| 8 | ditto | 1 | 84 |
| 9 | ditto | 2.4 | 100 |
| 10 | ditto | 4.7 | 100 |
| 11 | ditto | 9 | 100 |
| 12 | ditto | 23 | 100 |
| 13 | ditto | 37 | 100 |

From the above examples it will be noted that the zinc borate having 3.5 moles of water of hydration was compared with antimony oxide and that combinations of the two ingredients were also employed (Example 5 and Example 6).

It will be appreciated that the zinc borate having 3.5 moles water improves the fire rating of the polyester resin and generally accomplishes this more efficaciously than antimony oxide.

As a means of further demonstrating the advantages of the present invention other examples were prepared involving polyvinyl chloride in sheet form. The sheets were prepared in the manner described below:

A solution of epoxidized soybean oil (0.05 parts), and liquid barium-cadmium stabilizer (0.02 parts) in di-(2-ethyl-hexyl)-phthalate plastisizer (0.5–0.6 parts) was prepared. Vinyl chloride homopolymer (1 part) was added portion-wise to this slowly stirred solution.

When a homogenous mixture was obtained, the entire mass was deaerated under oil pump vacuum.

Individual sheets (approx. 8 × 8 × 0.125 inches) were prepared by adding the selected fire retardants as indicated in Examples 14–21 to 200 g. of plastisol stock, mixing well, deaerating and pouring into a glass mold. The plastisol was cured by heating the mold in a forced air oven at 350°F. for 45 minutes.

After storing for at least 48 hours at 70°F. and 50 percent relative humidity, the sheets were cut into strips 8 × 0.5 × 0.125 inches and tested by the IFTP test described above and by the Globar flame test method ASTM D-757.

The effectiveness of various zinc borates as fire retardant additives for polyvinyl chloride plastisols, particularly Geon 121 vinyl chloride homopolymer, is demonstrated below in the Examples 14–25. It will be noted that the examples include a comparison between $2ZnO \cdot 3B_2O_3 \cdot 3.5H_2O$ and $2ZnO \cdot 3B_2O_3 \cdot 7H_2O$. Example 24 also shows a mixture of antimony oxide and the zinc borate. From the examples, it will be discerned that the zinc borate having 3.5 moles of water of hydration lowers the burn rate of the polyvinyl plastisol and makes it self-extinguishing.

TABLE II

Globar Flame Test

Examples 14–22

| Ex. No. | Fire Retardant | % by Weight | S. E. time (min.) | Burn rate in./min. |
|---|---|---|---|---|
| 14 | Antimony oxide | 9 | 1.1 | 0.28 |
| 15 | $2ZnO \cdot 3B_2O_3 \cdot 3.5H_2O$ | 2.4 | | |
| | Antimony oxide | 2.4 | 1.8 | 0.23 |
| 16 | $2ZnO \cdot 3B_2O_3 \cdot 3.5H_2O$ | 3.2 | | |
| | Antimony oxide | 0.8 | | |
| | Chlorowax 500 | 15.3 | 1.9 | 0.27 |
| 17 | $2ZnO \cdot 3B_2O_3 \cdot 7H_2O$ | 4 | | |
| | Chlorowax 500 | 15.3 | 1.9 | 0.37 |
| 18 | $2ZnO \cdot 3B_2O_3 \cdot 3.5H_2O$ | 16.6 | 2.2 | 0.43 |
| 19 | Antimony oxide | 2 | | |
| | Chlorowax 500 | 15.6 | 2.3 | 0.29 |
| 20 | $2ZnO \cdot 3B_2O_3 \cdot 7H_2O$ | 16.6 | 2.4 | 0.47 |
| 21 | Chlorowax 500 | 15.9 | N.S.E.* | 0.47 |
| 22 | Control | | N.S.E.* | 0.52 |

*N.S.E. - not self-extinguishing

TABLE III

PVC Castings — IFTP Test

| Ex. | Fire Retardant | % by Weight | IFTP Rating |
|---|---|---|---|
| 23 | None | 0 | 16 |
| 24 | Antimony oxide | 2.5 | 80 |
| | $2ZnO \cdot 3B_2O_3 \cdot 3.5H_2O$ | 2.5 | |
| 25 | Antimony oxide | 5.0 | 68 |

In a modification of the test procedure, the following examples are set forth to show results of deterioration of polyvinyl chloride under the influence of heat which is maintained for a period to time as indicated in Table III. Various zinc borates were employed, showing a comparison between 3.5 moles of water, 7 moles of water and 9 moles of water, along with or without various other additives, such as Chlorowax 500, a chlorinated paraffin.

TABLE IV

PVC Plastisols - Heat Stability Study At 350°F.

Examples 26–33

| Example No. | Formulation | % by wt. | 20 min. | 30 min. | 40 min. | 60 min. |
|---|---|---|---|---|---|---|
| 26 | Control | — | nc | nc | nc | tan |
| 27 | $2ZnO \cdot 3B_2O_3 \cdot 7H_2O$ | 14.3 | | | | |
| | Chlorowax 500 | 13.6 | nc | nc | tan | black |
| 28 | $2 ZnO \cdot 3B_2O_3 \cdot 9H_2O$ | 14.3 | | | | |
| | Chlorowax 500 | 13.6 | nc | brown | black | black |
| 29 | $2ZnO \cdot 3B_2O_3 \cdot 3.5H_2O$ | 14.3 | | | | |
| | Chlorowax 500 | 13.6 | nc | nc | nc | discolor |
| 30 | $2ZnO \cdot 3B_2O_3 \cdot 7H_2O$ | 16.6 | nc | nc | tan | black |
| 31 | $2ZnO \cdot 3B_2O_3 \cdot 3.5H_2O$ | 16.6 | nc | nc | nc | nc |
| 32 | $2ZnO \cdot 3B_2O_3 \cdot 3.5H_2O$ | 4.7 | nc | nc | nc | nc |
| 33 | $2ZnO \cdot 3B_2O_3 \cdot 7H_2O$ | 4.7 | nc | nc | nc | tan | nc — No Change

The effect of the zinc borate of the present invention on the physical properties of polyvinyl chloride plastisols, including elongation and tensile strength is illustrated in the following examples wherein zinc borates of 3.5 moles of water, 7 moles of water and 9 moles of water were compared, as well as a comparison with antimony oxide.

TABLE V

Examples 34–38

| Ex. No. | Fire Retardant | % by wt. | Stress at 100% elongation(psi) | Tensile Strength (psi) | Elongation(%) |
|---|---|---|---|---|---|
| 34 | None | — | 680 | 840 | 140 |
| 35 | $2ZnO \cdot 3B_2O_3 \cdot 3.5H_2O$ | 9 | 650 | 800 | 140 |
| 36 | $2ZnO \cdot 3B_2O_3 \cdot 7H_2O$ | 9 | 630 | 960 | 190 |
| 37 | $2ZnO \cdot 3B_2O_3 \cdot 9H_2O$ | 9 | 640 | 910 | 180 |
| 38 | antimony oxide | 4.7 | 660 | 780 | 130 |

Two other standard tests which can be used in assessing the effectiveness of the zinc borate as a fire retardant are ASTM E-162 (also known as the National Bureau of Standards Radiant Panel Test) and ASTM D2863-30 (also known as the Oxygen Index Test). Correlation of the results of these tests as well as the above-described Intermittent Flame Test Procedure will give a good indication of the fire retardancy of the polymer being tested. For example, a radiant panel flame spread index of 15 or lower accompanied by an oxygen index of 35 percent or higher can be said to indicate fire retardance in the Class 1 region. The following is a description of the Radiant Panel Test.

RADIANT PANEL TEST

The equipment includes a 12 by 18-inch radiant heat panel, a specimen holder, a gas pilot, a stack, and proper instrumentation to assure reproducible test conditions. The radiant panel is mounted in a vertical position and supplied with a premixed gas-air mixture. Its energy output is maintained constant by a radiation pyrometer. The holder supports a 6 by 18-inch specimen in an inclined position so that the top 6-inch edge of the specimen is 4½ inches and the bottom edge 9⅝ inches from the radiant panel. The gas pilot is located near the top edge of the specimen. The stack, which is located above the specimen, collects heat and products of combustion from the burning specimen and supports the thermocouples for measuring the gas temperatures.

During typical tests the specimen is exposed to the radiant panel for 15 min. When sufficiently heated, it is ignited by the gas pilot. The rate of flame movement down the panel is recorded along with stack temperatures.

The test results reported are a flame spread index which is calculated from the time intervals the flame front arrived at 3-in. positions along the length of the specimen, the maximum observed stack temperature rise above that observed when testing asbestos-cement board, and a constant arbitrarily chosen to yield a flame spread index of approximately 100 for red oak. The index is computed in this manner to recognize both the ignition and heat evolution characteristics of the material being tested.

OXYGEN INDEX TEST

In the Oxygen Index Test, panels are cut to 5.0 × 0.25 × 0.125 inches and placed vertically in the center of a 3 inch diameter glass chimney. The atmosphere in the chimney is controlled by regulating separate nitrogen and oxygen inlet flow rates. The specimen is ignited at the upper end and the nitrogen and oxygen ratio adjusted until combustion is just supported. The minimum concentration of oxygen required to support combustion is reported as a percentage and this figure is defined as the oxygen index.

Several polyester resin test panels were prepared by the following procedure:

A flat piece of plywood of three-fourth inch thickness is used as a support. A layer of Mylar film is placed on the plywood support and on this are placed two 20 oz. Fiberglas matts. An extremely thin matt of Fiberglas material (veil) is placed on top of the matts and the resin mixture then applied to this composite and worked into the Fiberglas. A second sheet of Mylar film is placed on the matt and the matt worked and rolled with a roller until smooth. Weight is then applied to the matt by use of a second piece of plywood, and the matt allowed to cure for several hours. After the initial cure, the Mylar film is removed and the specimen panels cut for curing. The panels are cured at about 200°F. for 2 hours to give Fiberglas panels which after cutting to size are then ready for fire testing.

The resins tested were Hetron 92 (a chlorinated polyester produced by Hooker Chemical Corp. containing 28.5 percent chlorine), Stepan CX717 (a brominated polyester produced by Stepan Chemical Company), and a chlorinated resin prepared by styrenating a chlorinated polyester base to give a resin containing 28 percent chlorine. The resins were tested by the radiant panel test, oxygen index test and intermittent flame test described above. The results were as follows:

| Additive | Amt. (phr) | IFTP | Flame Spread Index | Oxygen Index % |
|---|---|---|---|---|
| Hetron 92 | | | | |
| Control | 0 | 87 | 23 | 30 |
| $2ZnO \cdot 3B_2O_3 \cdot 3.5H_2O$ | 5 | 100 | 15 | 34 |
| $2ZnO \cdot 3B_2O_3 \cdot 3.5H_2O$ | 15 | 100 | 14 | 36 |
| Stepan CX717 | | | | |
| Control | 0 | 100 | 12.5 | 34 |
| $2ZnO \cdot 3B_2O_3 \cdot 3.5H_2O$ | 5 | 100 | 7.2 | 35 |
| $2ZnO \cdot 3B_2O_3 \cdot 3.5H_2O$ | 15 | 100 | 8.3 | 39 |
| Chlorinated Polyester | | | | |
| Control | 0 | 45 | 15 | 28 |
| $2ZnO \cdot 3B_2O_3 \cdot 3.5H_2O$ | 10 | 100 | 6.1 | 32 |
| $2ZnO \cdot 3B_2O_3 \cdot 3.5H_2O$ | 6.5 | 100 | 5.4 | 34 |
| Antimony oxide | 0.5 | | | |
| $2ZnO \cdot 3B_2O_3 \cdot 3.5H_2O$ | 6 | 100 | 3.7 | 40 |
| Antimony oxide | 2 | | | |
| $2ZnO \cdot 3B_2O_3 \cdot 3.5H_2O$ | 6 | 100 | 12.7 | 37 |
| Antimony oxide | 1 | | | |
| Antimony oxide | 2 | 80 | 9.1 | 37 | phr = parts additive per hundred parts of resin

The present additives may be used with other polymers in addition to those shown in the above examples, such as chlorinated and brominated epoxy resins, polyvinylidine chloride, chlorinated rubbers, chlorinated polyethylene and brominated polystyrene as well as non-halogenated polymers, such as the polyolefins and polyesters, to which have been added halogenated additives. Preferably the resins should contain at least 10 percent by weight of halogen.

If desired other additives may be used in addition to antimony oxide which may be present in a percentage of up to about 10 percent by weight (zinc borate: antimony oxide weight ratio of about 1:1, for example), such as calcium carbonate, silica, sodium bicarbonate, borax, talc, jute, glass fibers, plasticizers, stabilizers, curing agents and accelerators, as well as pigments.

It is within the scope of the present invention to incorporate other ingredients such as plasticizers, dyes, pigments, fillers, stabilizers, antioxidants, antistatic agents and the like without detracting from the other advantageous properties of the polymers.

Various changes and modifications of the invention can be made and, to the extend that such variations incorporate the spirit of this invention, they are intended to be included within the scope of the appended claims.

What is claimed is:

1. A flame retarding composition comprising a halogenated polymer selected from the group consisting of brominated polyesters, polyvinyl chloride plastisols and chlori-nated polyesters, and a flame retarding amount of a zinc borate have the formula $2ZnO \cdot 3B_2O_3 \cdot 3.3$ to $3.7 \, H_2O$.

2. The composition of claim 1 wherein the halogenated polymer is a chlorinated polyester.

3. The composition of claim 1 wherein the halogenated polymer is polyvinyl chloride.

4. The composition of claim 1 wherein the zinc borate is present in the amount of 0.2 to 50 percent by weight of the composition.

5. The composition of claim 1 wherein the zinc borate is present in the amount of 0.5 to 30 percent by weight of the composition.

6. The composition of claim 1 wherein the zinc borate is present in the amount of 2 to 10 percent by weight of the composition.

7. The composition of claim 1 wherein antimony oxide is included in an amount up to and including 10 percent by weight of the composition.

8. The composition of claim 1 wherein the halogenated polymer contains at least 10 percent halogen.

9. The composition of claim 1 wherein halogenated hydrocarbon wax is included in an amount up to and including 20 percent by weight of the composition.

10. The composition of claim 1 wherein the zinc borate has the formula $2ZnO \cdot 3B_2O_3 \cdot 3.5H_2O$.

11. A fire-retarding composition comprising zinc borate of the formula $2ZnO \cdot 3B_2O_3 \cdot 3.5H_2O$ and antimony oxide.

12. The composition of claim 11 wherein said zinc borate and antimony oxide are present in a weight ratio of about 1:1.

13. The composition of claim 11 wherein a halogenated hydrocarbon wax is included.

14. The composition of claim 13 wherein said halogenated hydrocarbon wax is a chlorinated paraffin.

* * * * *